US012752463B2

(12) United States Patent
Tingle

(10) Patent No.: US 12,752,463 B2
(45) Date of Patent: Oct. 6, 2026

(54) APPARATUS, SYSTEM, AND METHOD FOR MANUFACTURING OF COMPOSITE STRUCTURES

(71) Applicant: UNIVERSITY OF FLORIDA RESEARCH FOUNDATION, INCORPORATED, Gainesville, FL (US)

(72) Inventor: Henry James Edward Tingle, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 82 days.

(21) Appl. No.: 18/777,974

(22) Filed: Jul. 19, 2024

(65) Prior Publication Data

US 2025/0058502 A1 Feb. 20, 2025

Related U.S. Application Data

(60) Provisional application No. 63/519,668, filed on Aug. 15, 2023.

(51) Int. Cl.

| | |
|---|---|
| ***B29C 33/52*** | (2006.01) |
| ***B29C 33/76*** | (2006.01) |
| ***B29C 70/54*** | (2006.01) |
| *B29K 63/00* | (2006.01) |
| *B29K 105/08* | (2006.01) |
| *B29K 307/04* | (2006.01) |

(52) U.S. Cl.

CPC .............. *B29C 33/52* (2013.01); *B29C 33/76* (2013.01); *B29C 70/54* (2013.01); *B29K 2063/00* (2013.01); *B29K 2105/08* (2013.01); *B29K 2307/04* (2013.01); *B29K 2829/04* (2013.01); *B29K 2995/0062* (2013.01)

(58) Field of Classification Search

None

See application file for complete search history.

(56) References Cited

U.S. PATENT DOCUMENTS

| | | | | |
|---|---|---|---|---|
| 6,374,570 | B1 * | 4/2002 | McKague, Jr. | ... B29C 66/43441 52/156 |
| 10,744,722 | B2 * | 8/2020 | Rossi | ................. B29D 99/0014 |
| 12,480,411 | B2 * | 11/2025 | Postec | ................ B29D 99/0025 |
| 2011/0168324 | A1 * | 7/2011 | Ender | .................. B29D 24/004 156/243 |

* cited by examiner

*Primary Examiner* — Yung-Sheng M Tsui
(74) *Attorney, Agent, or Firm* — Alston & Bird LLP

(57) ABSTRACT

A method, system, and apparatus are provided for creating complex-geometry composite parts with dissolvable internal support structures. Methods include: forming a core from a dissolvable material; layering composite material layers over the core; curing the composite material layers; and dissolving the core to leave cured composite layers of the composite part. Forming the core from the dissolvable material may include using three-dimensional printing to form the core. The dissolvable material may include polyvinyl alcohol. The core can include a channel formed therein, where layering composite material layers includes layering composite material layers within the channel of the core.

18 Claims, 6 Drawing Sheets

APPARATUS, SYSTEM, AND METHOD FOR MANUFACTURING OF COMPOSITE STRUCTURES

CROSS-REFERENCE TO RELATED APPLICATIONS

This application claims priority to U.S. Provisional Application No. 63/519,668, filed on Aug. 15, 2023, the contents of which are herein incorporated by reference in their entirety.

TECHNOLOGICAL FIELD

An example embodiment relates generally to an apparatus, system, and method for manufacturing of composite components, and more particularly, to an apparatus, system, and method for creating complex-geometry composite parts with the use of dissolvable internal support structures.

BACKGROUND

Composite structures are often formed from composite plies that are stacked upon one another and bonded together to form the composite structure. Composite structures are used in a wide variety of industries as they are generally lightweight, yet very strong. This combination of strong yet lightweight is highly desirable for a wide range of applications, ranging from wind turbine blades, to automotive structures, to aerospace vehicle components among many others. Historically, the complexity of composite structures was limited based on manufacturing techniques. Composite plies were laid over a mold with a resin either applied or embedded within the composite plies. The plies were then vacuum formed to the mold, and the mold was heated, often in an autoclave. This process required that all surfaces of the mold have draft angles, and complex curvatures and angles were often not feasible. Some composite parts are impossible to make using conventional mold-based manufacturing processes.

To form complex structures often required multiple composite parts to be joined together. This increases a weight of the composite structure and can introduce weak points in the structure through events such as delamination. Thus, such composite part formation is not ideal. Embodiments described herein are able to produce composite parts with complex shapes, without the drawbacks of prior processes.

BRIEF SUMMARY

A method, system, and apparatus are provided in accordance with an example embodiment in order to manufacture composite components, and more particularly, to an apparatus, system, and method for creating complex-geometry composite parts with the use of dissolvable internal support structures. Embodiments provided herein include method for forming a composite part including: forming a core from a dissolvable material and defining a channel formed therein; layering composite material layers over the core and into the channel; inserting a spar core into the channel having the composite material layers therein; layering additional composite material layers over the core and spar core disposed within the channel; curing the composite material layers and the additional composite material layers; and dissolving the core to leave cured composite layers of the composite part.

According to some embodiments the spar core is formed of the dissolvable material, where the method further includes dissolving the dissolvable material of the spar core. Forming the core from the dissolvable material of an example embodiment includes using three-dimensional (3D) printing to form the core. According to some embodiments the dissolvable material includes polyvinyl alcohol. The core of some embodiments defines a convoluted shape, and the channel defines a convoluted shape, and the spar defines a convoluted shape congruent with the channel.

The method of some embodiments further includes inserting the core with the composite material layers and the additional composite material layers into a vacuum bag as a bagged component; sealing the bagged component as a sealed, bagged component; and drawing a vacuum on the bag about the bagged component, where curing the composite material layers and the additional composite material layers includes curing the sealed, bagged component. According to certain embodiments the spar core is formed with bulkheads disposed therein defining chamber cores between the bulkheads. The chamber cores of some embodiments are connected to one another by a channel core. According to certain embodiments the spar core is formed of a dissolvable material, where the method further includes dissolving the dissolvable material of the spar core and the chamber cores dissolve to form orifices between chambers of a spar.

Embodiments provided herein include a system for forming a composite part including: a core formed from a dissolvable material and defining a channel formed therein; composite material layers layered over the core and into the channel; a spar core received within the channel having the additional composite material layers therein; additional composite layers are layered over the core and the spar core; where the composite material layers and the additional composite layers are cured, and where the core is dissolved to leave cured composite material layers of the composite part.

According to some embodiments the spar core is formed of the dissolvable material, where the spar core is dissolved to leave a hollow spar of cured additional composite layers. According to certain embodiments the core formed from the dissolvable material is formed using 3D printing. The dissolvable material of some embodiments includes polyvinyl alcohol. The core of some embodiments defines a convoluted shape and wherein the channel defines a convoluted shape, and wherein the spar defines a convoluted shape congruent with the channel.

The system of some embodiments further includes: a vacuum bag, where the core with the composite material layers and the additional composite material layers is inserted into the vacuum bag and sealed as a sealed, bagged component; where the composite material layers and the additional composite layers are cured as the sealed, bagged component. The spar core of an example embodiment includes bulkheads disposed therein defining chamber cores between the bulkheads. The chamber cores of some embodiments are connected to one another by a channel core. According to certain embodiments the spar core is formed of the dissolvable material, where the spar core is dissolved to leave a hollow spar of cured additional composite layers and where the chamber cores dissolve to form orifices between chambers of a spar.

Embodiments provided herein include a method including: forming a core from a dissolvable material; layering composite material layers over the core; curing the composite material layers; and dissolving the core to leave cured composite layers of the composite part.

According to some embodiments, forming the core from the dissolvable material includes using 3D printing to form the core. The dissolvable material of an example embodiment includes polyvinyl alcohol. The core of an example embodiment includes a channel formed therein, where layering composite material layers includes layering composite material layers within the channel of the core. The method of an example embodiment further comprises: inserting a spar core formed from a dissolvable material into the channel; and layering additional composite material layers over the spar and the composite material layers. The method of some embodiments includes curing the additional composite material layers; and dissolving the spar core from the cured composite part. According to certain embodiments, the composite material layers and the additional composite material layers are cured at the same time.

Embodiments provided herein include a system for forming a composite part including: a core formed from a dissolvable material; and composite material layers layered over the core, where the composite material layers are cured, and where the core is dissolved to leave cured composite layers of the composite part. The core formed from the dissolvable material is, in some embodiments, formed using 3D printing. The dissolvable material of some embodiments is polyvinyl alcohol.

According to some embodiments, the core includes a channel, where the composite material layers layered over the core include composite material layers layered within the channel of the core. The system of some embodiments further includes a spar core formed from a dissolvable material inserted into the channel, and additional composite material layers layered over the spar core and the composite material layers. The additional composite material layers are, in some embodiments, cured and the spar core is dissolved from the cured composite part. The composite material layers and the additional composite material layers are, in some embodiments, cured at a same time.

BRIEF DESCRIPTION OF THE DRAWINGS

Having described certain examples of the present disclosure in general terms above, reference will now be made to the accompanying drawings, which are not necessarily drawn to scale and wherein.

DETAILED DESCRIPTION

Figure 1:
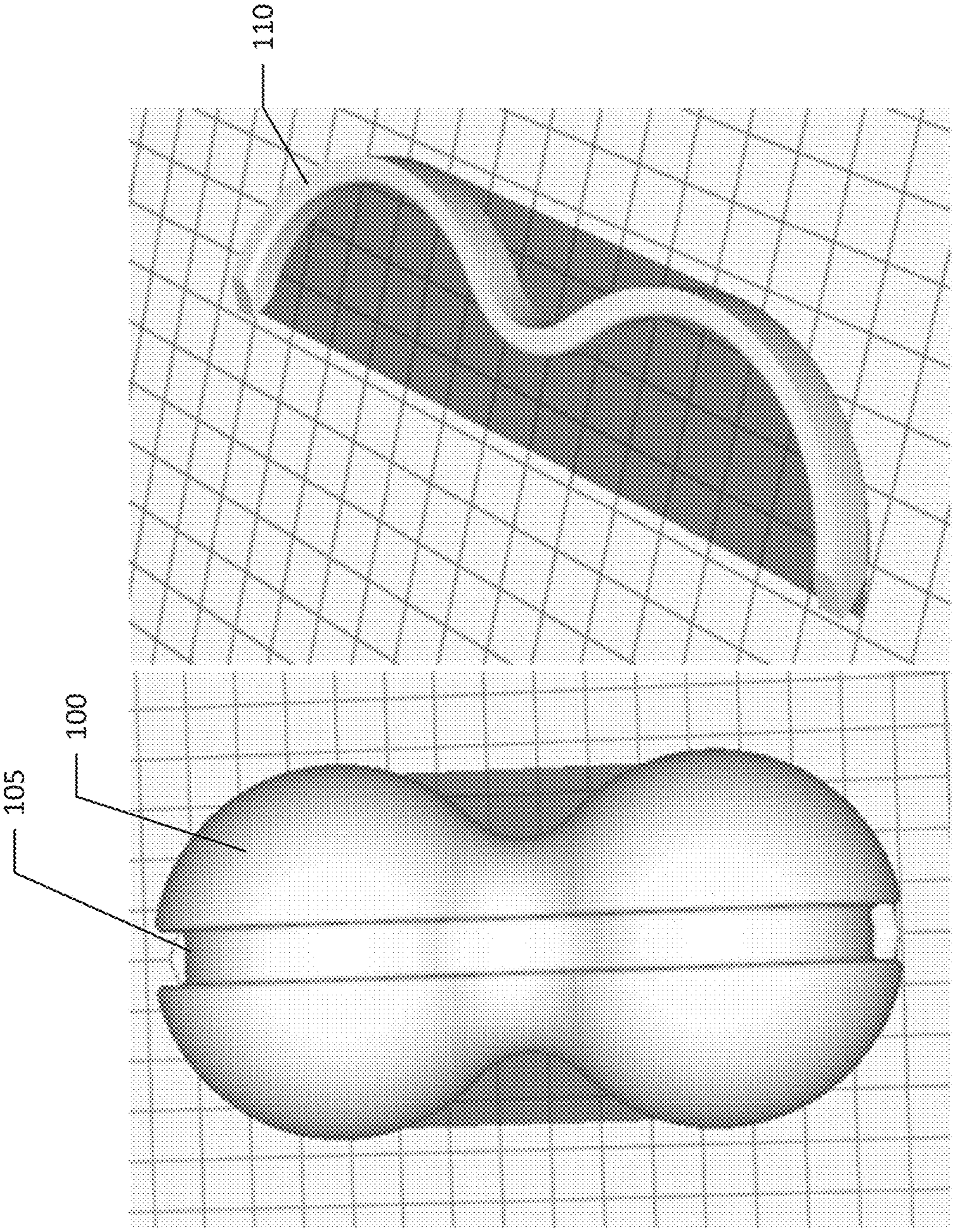
FIG. 1 illustrates a core and a stringer core to be received within a channel of the core according to an example embodiment of the present disclosure.

Some examples of the present disclosure will now be described more fully hereinafter with reference to the accompanying drawings, in which some, but not all examples of the present disclosure are shown. Indeed, the present disclosure may be embodied in many different forms and should not be construed as limited to the examples set forth herein; rather, these examples are provided so that this disclosure will satisfy applicable legal requirements. Like numbers refer to like elements throughout. As used herein, the terms “data,” “content,” “information,” and similar terms may be used interchangeably to refer to data capable of being transmitted, received, and/or stored in accordance with examples of the present disclosure. Thus, use of any such terms should not be taken to limit the spirit and scope of the present disclosure.

An apparatus, system, and method are provided in order to manufacture composite components, and more particularly, to an apparatus, system, and method for creating complex-geometry composite parts with dissolvable internal support structures. Embodiments described herein enable the creation of complex geometry parts and composites that would otherwise require core material to be permanently trapped inside a final composite structure if the structure were to be made of a unitary piece. Embodiments create high-accuracy, ultra-low weight composite parts without requiring full composite molds.

Embodiments described herein provide a manufacturing method that uses dissolvable material to act as a sacrificial internal structure to support the composite structure while in its uncured sate. In the uncured state, composite structures are flexible and, in most scenarios, cannot support their own weight without deflection, much less hold their shape. Only after the curing process do composite parts retain their final material properties or are then sufficiently rigid to be cured in an autoclave to achieve their final material properties and become rigid. Many composite parts that include cavities and complex shapes require core materials to support the composite before the composite structure is cured. In current manufacturing methods, the core material is typically non-removable and becomes a permanent addition to the final part. In some instances, this core material is not useful and provides little structural strength to the final part. This is because the majority of strength derived from these structural additions made by these methods is from an I-beam effect, created by two separate plates. As these plates separate, they add rigidity to the composite structure without requiring additional weight.

In some instances, the core material is not always unnecessary or even unwanted. There are some instances when large surface areas need to have two plates or surfaces separated, such as in composite structures that employ a honeycomb core material sandwiched between composite sheets, such as carbon fiber. The large surfaces allow the effects of buckling to become prominent, negating the I-beam effect. In such scenarios, the core materials are a welcome addition as they can do a great deal to prevent this buckling. Although in many applications, such core material is undesirable.

The fabrication of composite parts having complex geometries is challenging, particularly closed-shape parts requiring a core. FIG. 1 illustrates an example embodiment of such a composite part with the left-most image depicting a core 100. According to an example embodiment of the present disclosure, this core 100 can be fabricated in a dissolvable material. A stringer core 110 is shown on the right side of FIG. 1, where the stringer core is coupled to the core before fabrication of the composite part. The core 100 and stringer core 110 can be made by three-dimensional printing of dissolvable material, for example. According to the process of example embodiments, composite material is laid over the core 100 and into the groove 105. The stringer core 110 is then inserted into the groove 105, and additional composite layers are layered over the top of the core 100 and the stringer core 110. This sandwiches the stringer core 110 between layers of composite, forming a rib of composite materials. The stringer core 110 is smaller than the groove 105 to allow sufficient space for additional layers of composite material to be laid into the groove, and the groove still sufficiently large to receive the stringer core 110.

For cross-sectional scales such as the illustrated embodiment, the core material offers very little structural support and negates the use of the stringer as a conduit for wires, pipes, sensors, and other helpful equipment. The stringer core 110 of an example embodiment is formed of a dissolvable material, such as being printed in PVA (polyvinyl alcohol) filament. After the composite layers are laid up over the core 100 including the stringer core 110, the stringer core can be dissolved out of the final part along with the core 100, reducing a weight of the final part and opening up the channel to be used for other components as described above. This process further strengthens the composite part, even after the stringer core has been dissolved away. The core can be formed with holes or voids, or the holes can be drilled after curing of the part to encourage faster dissolving of the core once the composite part is cured.

Figure 2:
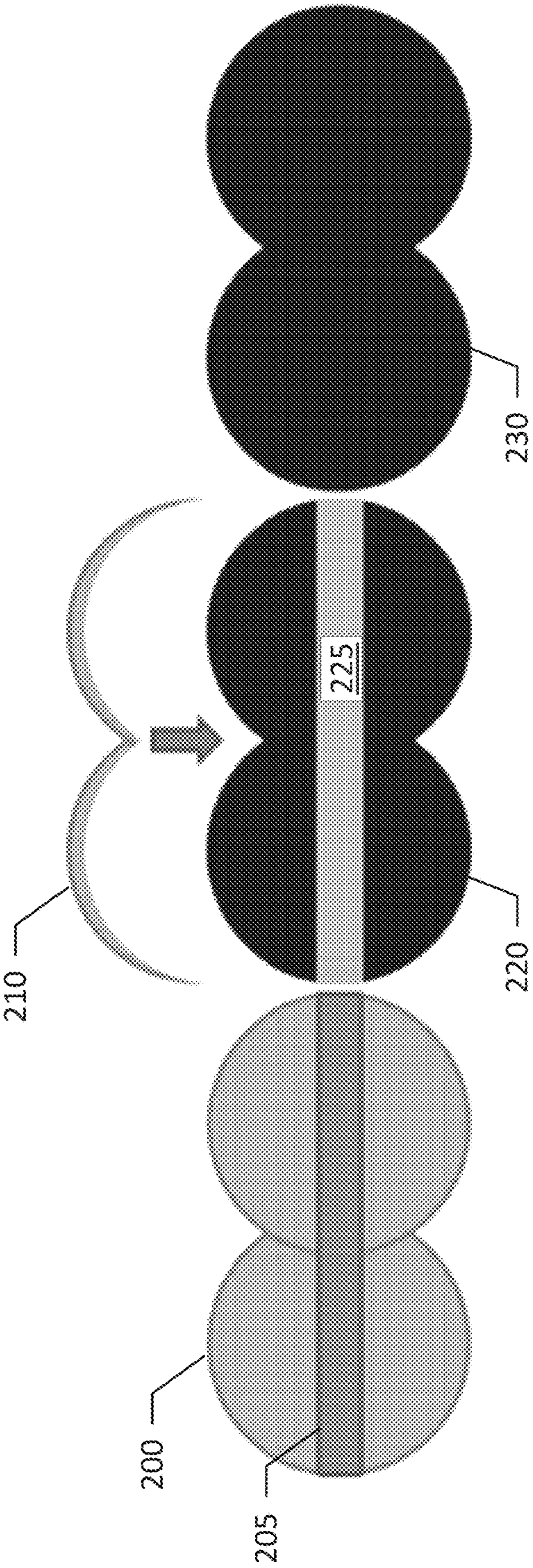
FIG. 2 illustrates a process for forming a composite part having a spar using dissolvable materials according to an example embodiment of the present disclosure.

The process of an example embodiment is shown in FIG. 2, which depicts a core 200 that can be printed using PVA filament. The core includes a groove 205 or channel for later receiving a spar core. The core 200 is wrapped in layers of composite material to form wrapped core 220. At this point, the composite-wrapped core can be cured, or the curing process can be performed together with the entire part later in the process. The spar core 210 is inserted into the groove 225 of the wrapped core 220, and the unified assembly is then wrapped in layers of composite materials to form a fully wrapped assembly 230. The fully wrapped assembly 230 is then cured to form the composite part. Once the fully wrapped assembly 230 is cured, if the part does not already include openings to the core and spar core, such holes can be drilled for the introduction of and draining of water. Flushing the fully wrapped assembly 230 with water dissolves both the spar core 210 and the core 200 such that the remaining part is a light weight and strong composite part.

The dissolvable material can, in some embodiments, be recaptured, processed, and re-used. While the illustrated embodiment of FIG. 2 includes a dissolvable core, in some parts this may be unnecessary as the core may be made from a conventional mold and processed separately in some embodiments. For complex composite parts as described herein, there is an additional benefit of having the core material be dissolvable. This process allows the part to be cured together in one process as one entity, enabling the composite layers shown as the wrapped core 220 and the fully wrapped assembly 230 to have a chemical bond therebetween that exceeds the strength of a mechanical bond that would be present if each composite layer were fully cured separately.

In an example embodiment in which the wrapped core 220 is first cured before the spar core 210 is received and subsequently wrapped, the cured, wrapped core would require sanding and surface preparation to be able to accept the adhesion of the next, outer layer of composites to bond to it mechanically. This mechanical bond is typically weaker than the chemical bond the layers can experience when cured together as one part. This is significant as a poor connection between layers can lead to delamination and failure of the part. There is also considerable time savings involved when requiring only one curing cycle. A typical composite epoxy requires around 24 hours to cure before it can be removed from a mold or sanded and modified. In the scenario where the core is made from a mold ahead of receiving the spar core, the process requires two complete curing cycles, one for each layer. This contrasts with a single curing cycle needed if the core is made from a dissolvable material. Forming the component monolithically with a single cure cycle requires no secondary cure cycle and thus does not necessitate any mechanical bonds. This increases the strength of parts molded according to example embodiments described herein, while lowing manufacturing time and increasing a lifespan of the part. Further, the chances of separation or delamination of support structures such as ribs from a main component of the skin or shell is less likely when they are formed monolithically instead of in separate cures as separate parts.

For the parts described above to be formed using conventional molding techniques without a permanent core, the parts would require separate fabrication with subsequent joining of the parts. For example, a shell molded in multiple pieces with the spar molded separately, and then joined. In such an embodiment, the shell would be very delicate and easily structurally compromised. The addition of the spar would require adhesive, and the strength of the assembly would rely on the spar fitting sufficiently well within the shell with the adhesive there between. This introduces potential failure points at the adhesive and the interface between the spar and shell. Further, this two-part assembly would generally be heavier than if the part were formed as described by the processes of the present disclosure.

While composite parts have a wide array of applications, composite parts are particularly desirable in the aerospace industry. Weight reduction in aircraft is imperative to improving performance and fuel economy. Further, airline parts have unique requirements for strength, flexibility, and performance that is less critical in many terrestrial applications. Many aircraft share remarkable similarities in their internal structures. Aircraft frames generally use a combination of stringers, spars, and other structural elements to form their internal frames. The purpose of these different components is to add rigidity and distribute loads experienced by the airframe. Employing embodiments described herein of dissolvable core composite parts, many of these stringers and potentially even main wing spars can be replaced with more efficient composite versions of these parts.

Flight efficiency is heavily dependent upon properties of a vehicle that takes flight. Vehicles designed to fly can include aircraft and spacecraft, which may be manned or unmanned and can be of any size; however, all vehicles designed for flight will herein be referred to generally as aircraft, despite some such vehicles designed to operate in space in the absence of air. Large aircraft can employ large propulsion systems that carry heavier payloads such as passengers and/or cargo for aircraft and payloads such as satellites or passengers into orbit for spacecraft.

One factor in scaling propulsion systems is a power-to-weight ratio of the propulsion systems. Small UAVs may use various types of propulsion systems; however, most cost-effective propulsion systems include electric propulsion, which often includes a motor-driven rotor. Such propulsion systems require a power source, such as a battery to power the motor, and batteries are often relatively heavy and dense compared to other components of UAVs. As such, weight reduction in small UAVs may rely on reducing the weight of any component in an effort to improve the flight range for the UAV. Every gram of weight can impact the range and efficiency of small UAVs.

One specific type of UAV that faces great challenges is micro-aerial vehicles or MAVs. This market is highly focused on weight savings as every opportunity to reduce a weight of the craft by as little as a gram is of significant value to adding to battery life and, therefore, flight time/range. MAVs can be very compact, such as 100 millimeters long or less in some embodiments. To help save weight, composite materials are often employed. However, conventional manufacturing techniques limit the amount of weight reduction of complex parts, particularly when the parts are very small and potentially very delicate.

In the ever growing aircraft fields of UAVs and vertical take-off and landing vehicles (VTOLs), specifically MAVs, there is a major need for weight reduction in parts without compromising structural integrity. While battery power density is increasing substantially, batteries still represent a substantial load for battery-powered vehicles. Thus, with batteries being a limiting factor, it is important to find other areas where weight savings can be achieved. Embodiments provided herein can reduce the weight of structural components while forming smooth, strong, and slender parts that reduce weight and improve efficiency. Embodiments can be employed, for example, to form long, slender wings for a plane-like electric drone, while enabling the wings to carry batteries thereby reducing the components needed to be housed in a fuselage. A smaller fuselage reduces drag and material cost, while increasing range. For MAVs, parts can be manufactured faster as they can be made monolithically and can take on shapes otherwise not possible for improved strength-to-weight ratio.

Further benefits of employing composite parts as described herein allows many of these structural elements to function as conduits and enables a more efficient manner of hollowing out of wing space. Many structural elements are used in the structure of a wing, particularly in the main body of a wing. Fuel tanks are often formed within cavities of the wings. Employing embodiments described herein, the internal webbing of these parts could be removed and allow more volume for fuel tanks or batteries, and/or to permit cooling channels for batteries.

Current construction methos often result in straight and flat spars being used. While these components are optimized in their positional placement and general construction, they are still typically limited by reasonable and traditional manufacturing methods. With the implementation of more and more composites in aerospace manufacturing, there is opportunity to create structural elements with shapes that are optimized to the load distributions in the aircraft.

One particular example includes wing spars that may not be perfectly straight, but instead follow the paths of the highest load much more precisely, such as found through finite element analysis of the forces acting on the wing during flight. Embodiments can be employed for webbing material that better matches the curvature of complex wing and fuselage sections. Optimized parts, as found through finite element analysis, include more organic shapes that cannot be readily manufactured using traditional methods, but are possible using composite forming techniques described herein. In this scenario, a core of the shape of the optimized part could be printed, laid up around, and then the internals dissolved. When this type of optimization is applied to wings, similar organic shapes would be formed. These shapes would be extremely difficult to produce with traditional manufacturing methods.

Figure 3:
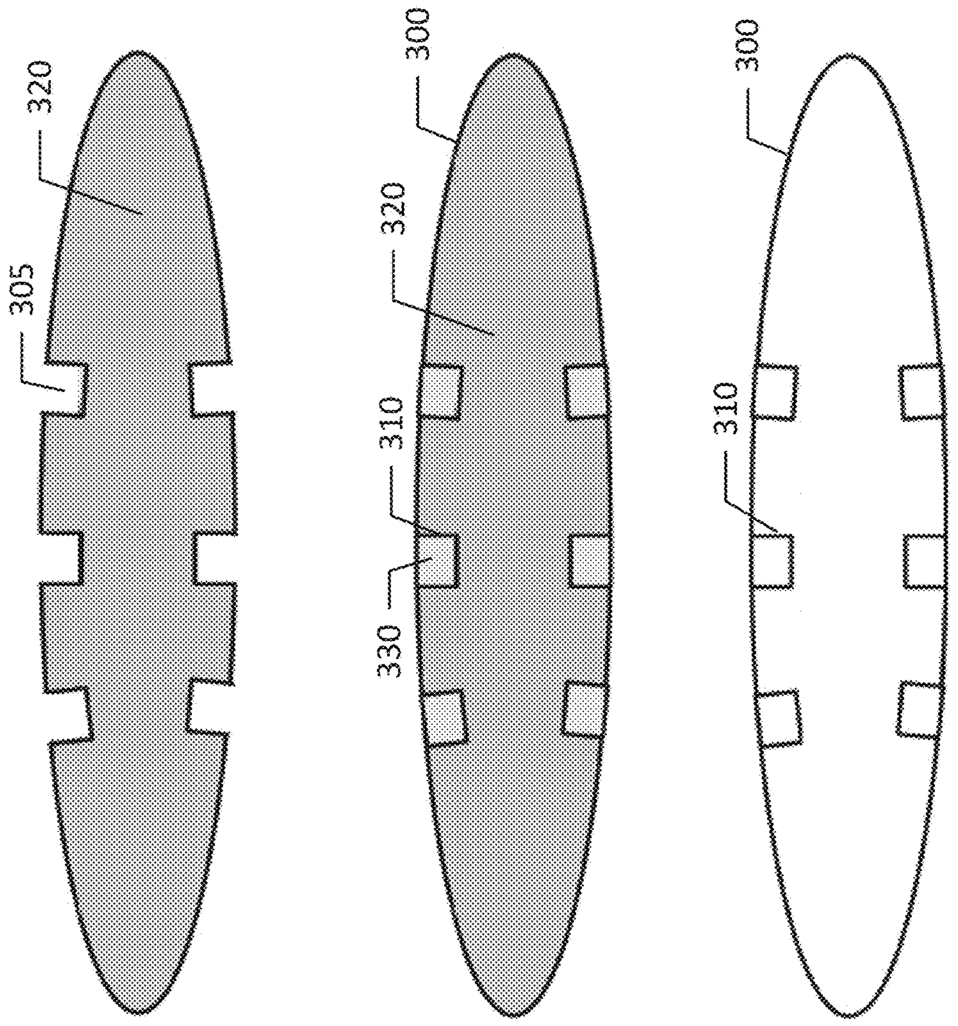
FIG. 3 illustrates a process for forming a wing and spars thereof from composite material layers and dissolvable core materials according to an example embodiment of the present disclosure.

According to some embodiments, the process described herein can be used to create both the wing core and the structural elements such as the spar. FIG. 3 illustrates an example embodiment of forming a wing of an aircraft as described herein. As shown at the top of FIG. 3, a core 320 of a wing may be formed of a dissolvable material. This core is then encased in layers of composite material. Optionally, particularly if the core is formed of a porous material, the core can be waxed with a mold release before encasing the core in composite material. The core of the aircraft wing includes channels 305 for the spar cores into which the layers of the composite are formed over the core 320. As shown in the middle of FIG. 3, after the layers of composite material are layered over the core, dissolvable material 330 is inserted into the channels 305 forming the spars. The wing core with the dissolvable material 330 in the channels 305 is then wrapped with more layers of composite materials. Once this is complete, the wing assembly may be cured. The curing process may take place with vacuum bagging and heating in an autoclave, for example. After the composite layers are cured, the dissolvable material is dissolved out from the core 320 and the dissolvable material 330 in the channels 305 to leave the wing 300 including spars 310 in a hollow, light weight, and strong structure.

According to example embodiments, the core can be formed without a mold, such as using three-dimensional printing. This can eliminate the need for expensive fixed molds, while still achieving a dimensionally accurate part with all of the structural benefits. Such production can be in small or large scale, and is ideally suited to prototyping with accurate structural, weight, and performance properties relative to later production models. For larger production molds of spars and other components, the dissolvable material may be cast to form the shapes needed such that a three-dimensional printing time latency can be avoided. The channels inside the ribs may be prioritized and dissolved first to increase efficiency of the dissolving of the dissolvable material.

Figure 4:
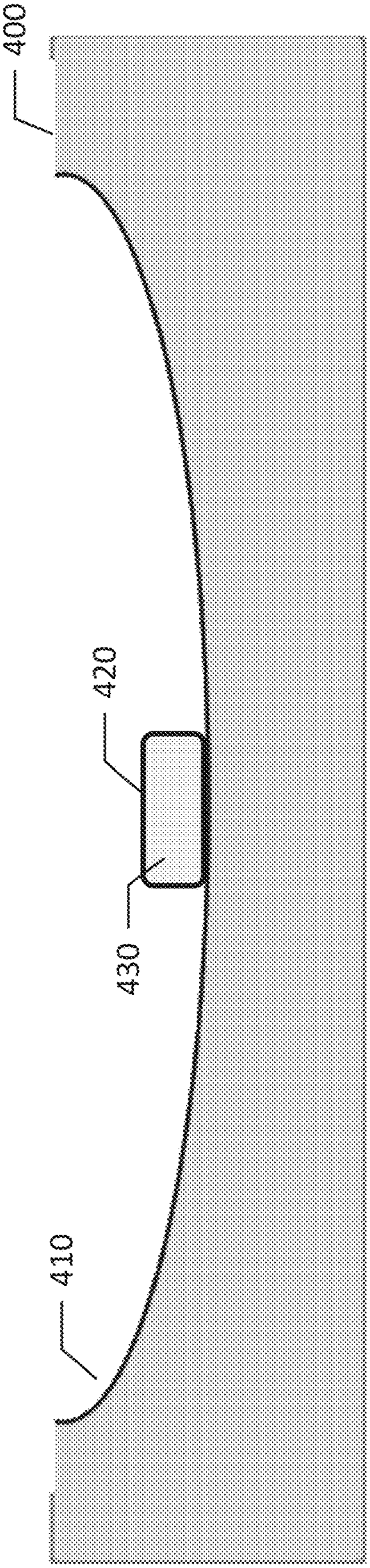
FIG. 4 illustrates a conventional mold for a composite structure and using a dissolvable material for formation of a spar within the composite structure according to an example embodiment of the present disclosure.

Embodiments can be employed in conjunction with conventional molds while still benefiting from a degree of flexibility and efficiency. A non-dissolvable mold of the wing itself may be used to create the outermost skin of the wing, while dissolvable spars can be used to create spars within the wing frame. For example, as shown in FIG. 4, a wing form can have a traditional layup mold 400 where layers of composites 410 are laid up forming the composite wing shape. A dissolvable spar core 430 can be installed over the layers of composites 410, and additional layers of composites 420 can be used to surround the spar core 430, forming the spar. Once all composite layers are properly laid, the composite part can be cured, and the composite wing and spar rigidly formed. The dissolvable spar core 430 can then be dissolved leaving a hollow spar that can be used as a conduit for various purposes. Embodiments can be used in conjunction with existing molds from conventional molding techniques while adding integrated structural members with hollow cores such that an existing wing mold, for example, can employ a light weight and strong hollow spar.

Embodiments of the present disclosure can create composite parts monolithically without the use of bolts or fasteners, which are vulnerable parts of a structure along with the apertures through which they are fastened. In many conventional parts, rivets, holes, and other connecting assemblies experience loading cycles and fatigue. This can lead to premature failure of a part and can be a significant factor when determining the lifetime of a part.

Figure 5:
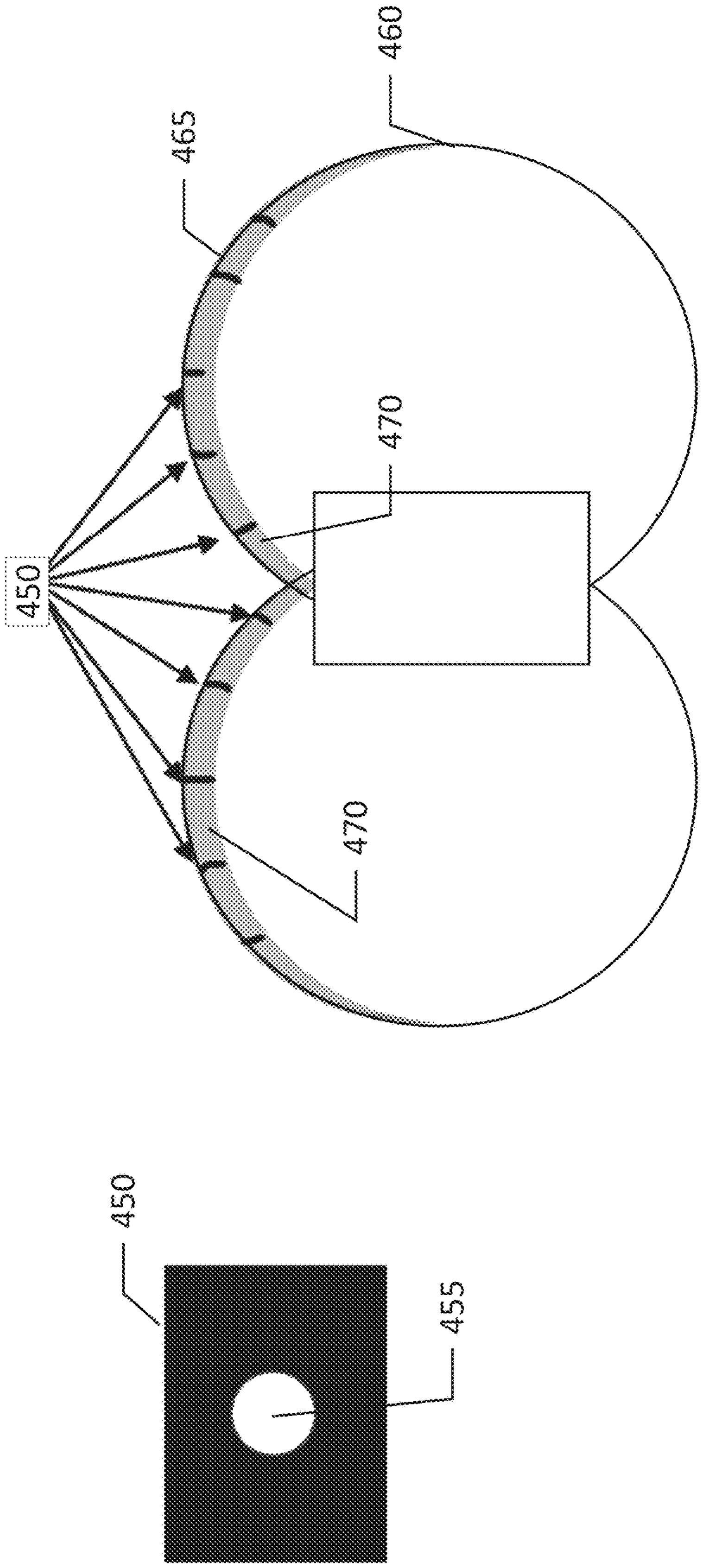
FIG. 5 illustrates a dissolvable core structure including bulkheads for structural rigidity according to an example embodiment of the present disclosure.

The absence of core material in larger, thin-walled parts can lead to component buckling and failing and making the application of the dissolvable structure method less versatile. However, for larger structural elements, such as wing spars, pre-formed bulkheads can be set in select locations inside of a wing spar. FIG. 5 illustrates an example embodiment of a core 460 with a spar core 465 formed with bulkheads 450 disposed at various locations along a length of the spar core. The bulkhead is also shown with an enlarged frontal view on the left side of FIG. 5. The bulkheads 450 define chambers 470 between pairs of bulkheads. Each chamber 470 can employ an entry hole and a drain hole that enables a solvent material into the chamber, and the drain hole can allow the solvent material and the dissolved core material to drain from the chamber. Alternatively, each bulkhead can include an orifice 455 therethrough to allow passage of the solvent material between chambers rather than having separate entry and drain holes. This can enable the structure to be divided into as many sections as needed to introduce the appropriate number of bulkheads. These bulkheads can be used to prevent buckling while still allowing major structural elements to not only be hollow, but to be made monolithically and follow complex and organic paths as described above.

Figure 6:
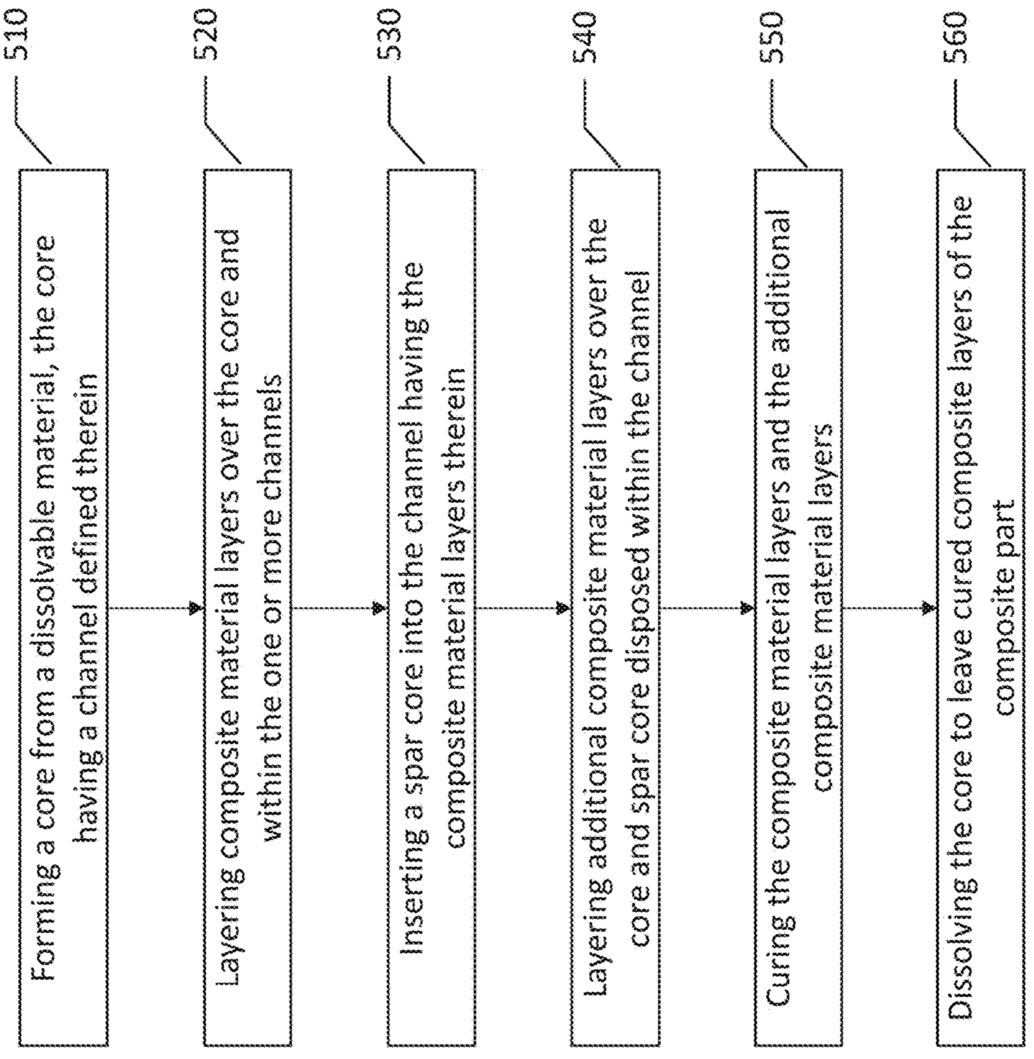
FIG. 6 is a flowchart of a process for forming a composite part using dissolvable core materials according to an example embodiment of the present disclosure.

FIG. 6 illustrates a flowchart of a method for forming a composite part. It will be understood that each block of the flowchart, and combinations of blocks in the flowchart, may be implemented by various means and can include more or fewer steps depending upon the specific implementation. Accordingly, blocks of the flowcharts support combinations of means for performing the specified functions and combinations of operations for performing the specified functions. It will also be understood that one or more blocks of the flowcharts, and combinations of blocks in the flowcharts, can be implemented by various techniques.

As shown in FIG. 6, a core is formed from a dissolvable material, the core having a channel defined therein as shown at 510. At 520, composite material layers are layered over the core and within the channel. A spar core is inserted into the channel having the composite layers therein at 530. Additional composite material layers are layered over the core and the spar core at 540. The composite material layers and the additional composite material layers are cured at 550. At 560, the core is dissolved from the cured composite part to leave a hollow, lightweight, and strong composite part.

In some embodiments, certain operations of the operations above may be modified or further amplified. Furthermore, in some embodiments, additional optional operations may be included. Modifications, additions, or amplifications to the operations above may be performed in any order and in any combination.

Many modifications and other examples of the present disclosure set forth herein will come to mind to one skilled in the art to which the present disclosure pertains having the benefit of the teachings presented in the foregoing descriptions and the associated drawings. Therefore, it is to be understood that the present disclosure is not to be limited to the specific examples disclosed and that modifications and other examples are intended to be included within the scope of the appended claims. Moreover, although the foregoing descriptions and the associated drawings describe examples in the context of certain combinations of elements and/or functions, it should be appreciated that different combinations of elements and/or functions may be provided by alternative examples without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purpose of limitation.

That which is claimed:

1. A method for forming a composite part comprising:
- forming a core from a dissolvable material and defining a channel formed therein;
- layering composite material layers over the core and into the channel;
- inserting a spar core into the channel having the composite material layers therein;
- layering additional composite material layers over the core and spar core disposed within the channel;
- curing the composite material layers and the additional composite material layers; and
- dissolving the core to leave cured composite layers of the composite part.

2. The method of claim 1, wherein the spar core is formed of the dissolvable material, wherein the method further comprises dissolving the dissolvable material of the spar core.

3. The method of claim 1, wherein forming the core from the dissolvable material comprises using three-dimensional (3D) printing to form the core.

4. The method of claim 1, wherein the dissolvable material comprises polyvinyl alcohol.

5. The method of claim 1, wherein the core defines a convoluted shape and wherein the channel defines a convoluted shape, and wherein the spar core defines a convoluted shape congruent with the channel.

6. The method of claim 1, further comprising:
- inserting the core with the composite material layers and the additional composite material layers into a vacuum bag as a bagged component;
- sealing the bagged component as a sealed, bagged component; and
- drawing a vacuum on the vacuum bag about the bagged component,
- wherein curing the composite material layers and the additional composite material layers comprises curing the sealed, bagged component.

7. The method of claim 1, wherein the spar core is formed with bulkheads disposed therein defining chamber cores between the bulkheads.

8. The method of claim 7, wherein the chamber cores are connected to one another by a channel core.

9. The method of claim 8, wherein the spar core is formed of a dissolvable material, wherein the method further comprises dissolving the dissolvable material of the spar core, and wherein the chamber cores dissolve to form orifices between chambers of a spar.

10. A system for forming a composite part comprising:
- a core formed from a dissolvable material and defining a channel formed therein;
- composite material layers layered over the core and into the channel; and
- a spar core received within the channel having the composite material layers therein;
- additional composite material layers are layered over the core and the spar core;
- wherein the composite material layers and the additional composite material layers are cured, and wherein the core is dissolved to leave cured composite material layers of the composite part.

11. The system of claim 10, wherein the spar core is formed of the dissolvable material, wherein the spar core is dissolved to leave a hollow spar of cured additional composite material layers.

12. The system of claim 10, wherein the core formed from the dissolvable material is formed using three-dimensional (3D) printing.

13. The system of claim 10, wherein the dissolvable material comprises polyvinyl alcohol.

14. The system of claim 10, wherein the core defines a convoluted shape and wherein the channel defines a convoluted shape, and wherein the spar core defines a convoluted shape congruent with the channel.

15. The system of claim 10, further comprising:

a vacuum bag, wherein the core with the composite material layers and the additional composite material layers is inserted into the vacuum bag and sealed as a sealed, bagged component;

wherein the composite material layers and the additional composite material layers are cured as the sealed, bagged component.

16. The system of claim 10, wherein the spar core comprises bulkheads disposed therein defining chamber cores between the bulkheads.

17. The system of claim 16, wherein the chamber cores are connected to one another by a channel core.

18. The system of claim 17, wherein the spar core is formed of the dissolvable material, wherein the spar core is dissolved to leave a hollow spar of cured additional composite material layers and wherein the chamber cores dissolve to form orifices between chambers of a spar.

* * * * *